United States Patent [19]

Desrosiers et al.

[11] Patent Number: 5,452,241
[45] Date of Patent: Sep. 19, 1995

[54] SYSTEM FOR OPTIMIZING ARGUMENT REDUCTION

[75] Inventors: Bernard Desrosiers, Boissise le Roi; Louis Didier, Fountainebleau; Didier Pinchon, Les Ulis; Andre Steimle, Evry, all of France

[73] Assignee: International Business Machines Corporation, Armonk, N.Y.

[21] Appl. No.: 209,589

[22] Filed: Mar. 14, 1994

[30] Foreign Application Priority Data

Apr. 29, 1993 [EP] European Pat. Off. ........... 93480051

[51] Int. Cl.⁶ .......................... G06F 7/00; G06F 7/38
[52] U.S. Cl. ......................... 364/748; 364/715.01
[58] Field of Search ............... 364/715.01, 718, 719, 364/720, 721, 722, 729, 735, 736, 748

[56] References Cited

U.S. PATENT DOCUMENTS

| | | | |
|---|---|---|---|
| 4,484,259 | 11/1984 | Palmer et al. | 364/736 X |
| 4,777,613 | 10/1988 | Shahan et al. | 364/748 |
| 4,956,799 | 9/1990 | Nakayama | 364/729 |
| 5,042,001 | 8/1991 | Brightman et al. | 364/736 |
| 5,235,535 | 8/1983 | Nakayama | 364/735 X |

FOREIGN PATENT DOCUMENTS 0268123 5/1988 European Pat. Off. .
0276856 8/1988 European Pat. Off. .

OTHER PUBLICATIONS

Agarwal et al., "New Scalar and Vector Elementary Functions for the IBM System/370", IBM Journal of Res. & Dev., vol. 30, No. 2, pp. 3–86, pp. 126–144, 1986.
"Floating Point 2:1 High Level Design", IBM TDB, vol. 34, No. 7B, pp. 12–19, pp. 283–285, 1991.
Ferguson, Jr. et al., "Accurate and Monotone Approximations of Some Transcendental Function", Proceedings of the 10th IEEE Symp. on Comp. Arithmetic, pp. 6–91, pp. 237–244, 1991.

*Primary Examiner*—Roy N. Envall, Jr.
*Assistant Examiner*—Chuong D. Ngo
*Attorney, Agent, or Firm*—Stephen T. Keohane; Homer L. Knearl

[57] ABSTRACT

A method for approximating mathematical functions using polynomial expansions is implemented in a numeric processing system. A partial remainder operation is set forth for high accuracy reduction of polynomials whose arguments are greater than pi/4. The method may be practiced in a processor having a bus of approximately half the width of the precision of the desired result. Temporary registers are utilized for the storage of intermediate results. Full bus width accuracy is obtained through successive half bus width operations.

2 Claims, 7 Drawing Sheets

|   (4/PI) high   |   (4/PI) low   |
|---|---|
| 0             66 | 67          133 |

|   | x |
|---|---|
| x | 0           66 |

| ((4/PI) low) *X | don't care |
|---|---|
| 0             66 | 67          133 |

| (((4/PI) high) *X) high | (((4/PI) high) *X) low |
|---|---|
| 0             66 | 67          133 |

(with + sign to the left)

| ((4/PI) *X) high | ((4/PI) *X) low |
|---|---|
| 0             66 | 67          133 |

FIG. 5

SYSTEM FOR OPTIMIZING ARGUMENT REDUCTION

The present invention relates to numerical data processors in general, and more particularly to a system for optimizing argument reduction in these processors.

In order to provide greater computing power for those applications requiring significant numbers of floating-point operations, numerical data processors feature the basic floating-point operations such as addition, subtraction, multiplication or division. Commonly, these floating-point operations are integrated into the data processor silicon chip (see for example the 80486 processor from the "INTEL" Corporation); alternatively, they are provided in a separate numerical data processor so-called mathematical or numeric coprocessor (such as the 80387 coprocessor from the "INTEL" Corporation, or the 83D87 coprocessor from the "CYRIX" Corporation) which cooperates with the main data processor to execute the said floating-point operations, In almost all these processors or coprocessors, trigonometric functions are approximated by polynomials such as Tchebitchev polynomial for Sine and Cosine functions, or Pade rational polynomial for the Tangent function. It is well-known to the man skilled in the art that the higher the degree of the polynomials, the better the accuracy of the approximation will be, but also the greater computation time (higher number of processor cycles).

Therefore, to provide acceptable accuracy within acceptable computation time, most processors compute lower degree polynomial approximation, but on arguments having an absolute value in a limited range (such as 0 to PI/4), after reduction of the actual argument for which the trigonometric value is required.

All known processors however fail to compute argument reduction with a good accuracy on a wide range comprised for example between 0 and 2E63, and consequently fail to compute trigonometric functions for arguments in such a range with an equally good accuracy.

This is the case in the "CYRIX" 83D87 coprocessor comprising both a hardware multiplier array and an independent 64-bit mantissa Arithmetic Logic Unit (ALU). Trigonometric functions are there too evaluated by polynomial approximation for arguments between 0 and PI/4. Arguments outside this range are reduced via a partial remainder operation with respect to PI/4, leading to a 5% increase in instruction execution time. Accuracy however is very poor as shown hereafter:

| Argument range | Function | Exactness | Wrong bits |
| --- | --- | --- | --- |
| [0;4PI] | Sin | 91% | 9 |
| | Cos | 91% | 11 |
| | Tan | 80% | 9 |
| [2E12;2E13] | Sin | 0.3% | 21 |
| | Cos | 0.3% | 21 |
| | Tan | 0% | 21 |
| [2E62;2E63] | Sin | 0% | 64 |
| | Cos | 0% | 64 |
| | Tan | 0% | 64 |

It is therefore an object of the present invention to provide a system for optimizing argument reduction in a processor.

It is a further object of the invention to provide a system for argument reduction with high accuracy, fast convergence and little dedicated resources in a processor.

It is yet a further object of the invention to provide such a system which allows reduction to a value comprised between 0 and a multiple of PI of an argument having a value up to 2E63, with an accuracy of less than 2E-63, reached in a low number of processor cycles and yet requiring minimal dedicated silicon area.

The invention specifically includes in a processor comprising:

a first block operative to perform pipeline ADD-/SUB/COMPARE operations on argument mantissa including:
a first adder,
an aligner,
a first output register, whose most significant bit is the carry-out bit generated by the first adder, the output of said first block being connected to a normalizer,
a leading zero detector/encoder, and
a second output register,
a second block operative to perform pipeline ADD-/SUB/COMPARE operations on argument exponents, including a second adder and a third output register whose output is connected to an encoder controlling the aligner,
a third block operative to perform pipeline MULTIPLY operations on argument mantissa including a multiplier, whose outputs are fed back into the inputs of the first adder, and
a stacker to pipeline arguments and a memory for providing input constant values to respectively first, second and third block,
a fourth output register being connected to the output of the second adder,
means for allowing the encoder to also control the normalizer, and
means for allowing the second output register to shift its content by a number of bits, and input the same number of bits from the first adder as its most significant bits.

The invention will be better understood from the following detailed description read in conjunction with the following schematics:

FIG. 1 showing internal general algorithm according to the invention for the calculation of trigonometric functions.

FIG. 2 illustrating the 80-bit double extended IEEE precision format.

FIG. 3 describes a known processor on which the solution of the present invention is applied.

FIG. 4 describes added hardware in the dataflow of the known processor according to the invention.

FIG. 5 details just performing successive ordinary 67 bit calculations.

In all figures, underlined references indicate BUS WIDTHS.

Numerical values or data used in scientific or technical calculations are expressed in a floating-point number configuration consisting of a sign S, an exponent E and a mantissa M, which permits the expression of a wide range of numerical values in a limited number of bits.

There is a number of different standard formats to implement this configuration. In particular, a typical widely accepted floating-point format is the standard format proposed by the Institute of Electrical and Electronics Engineers (IEEE). This standard defines four floating-point formats: single, single extended, double and double extended precision.

Figure 2:
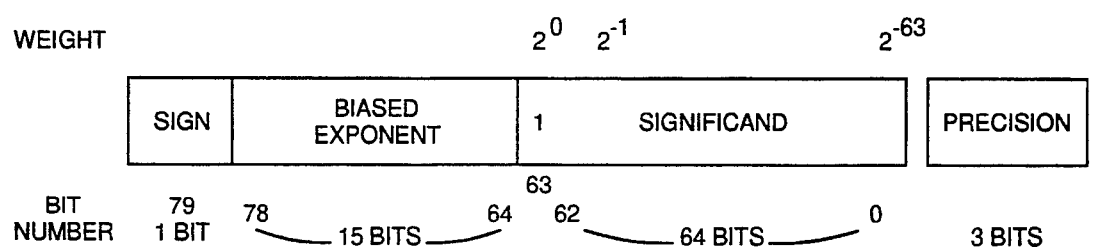

For sake of illustration, the 80-bit double extended precision format will be discussed below. As illustrated FIG. 2, it consists of a 1-bit sign, a 15-bit exponent and a 64-bit significant. In this format, at location 63, an explicit 1 is stored in the significant part of the format, except for some values such as zero. The remaining 63-bit part of the significant is so-called the mantissa M. In addition, the exponent is expressed in a biased form, i.e. a constant referred to as BIAS=16383 is added to the real value E of the exponent (true exponent). With the format of FIG. 2, 64 mantissa bits of precision are obtained, one can therefore represent a number within the range of 2E-16445 (the smallest denormalized number) and 2E16384 (the Greatest positive number).

More Generally, according to the IEEE standard format, the value of a real number N is given by $$N = C((-1)^{**}S)^*(1.M)^*(2^{**}(E\text{-BIAS}))$$

wherein S=0 for a positive number and S=1 for a negative one.

More detailed explanation regarding this format can be found in European patent application 91480188.1 (FR991007) filed on Dec. 20th, 1991, and assigned to the same assignee as the present application, the teaching of which is incorporated in full in the following detailed description.

Figure 1:
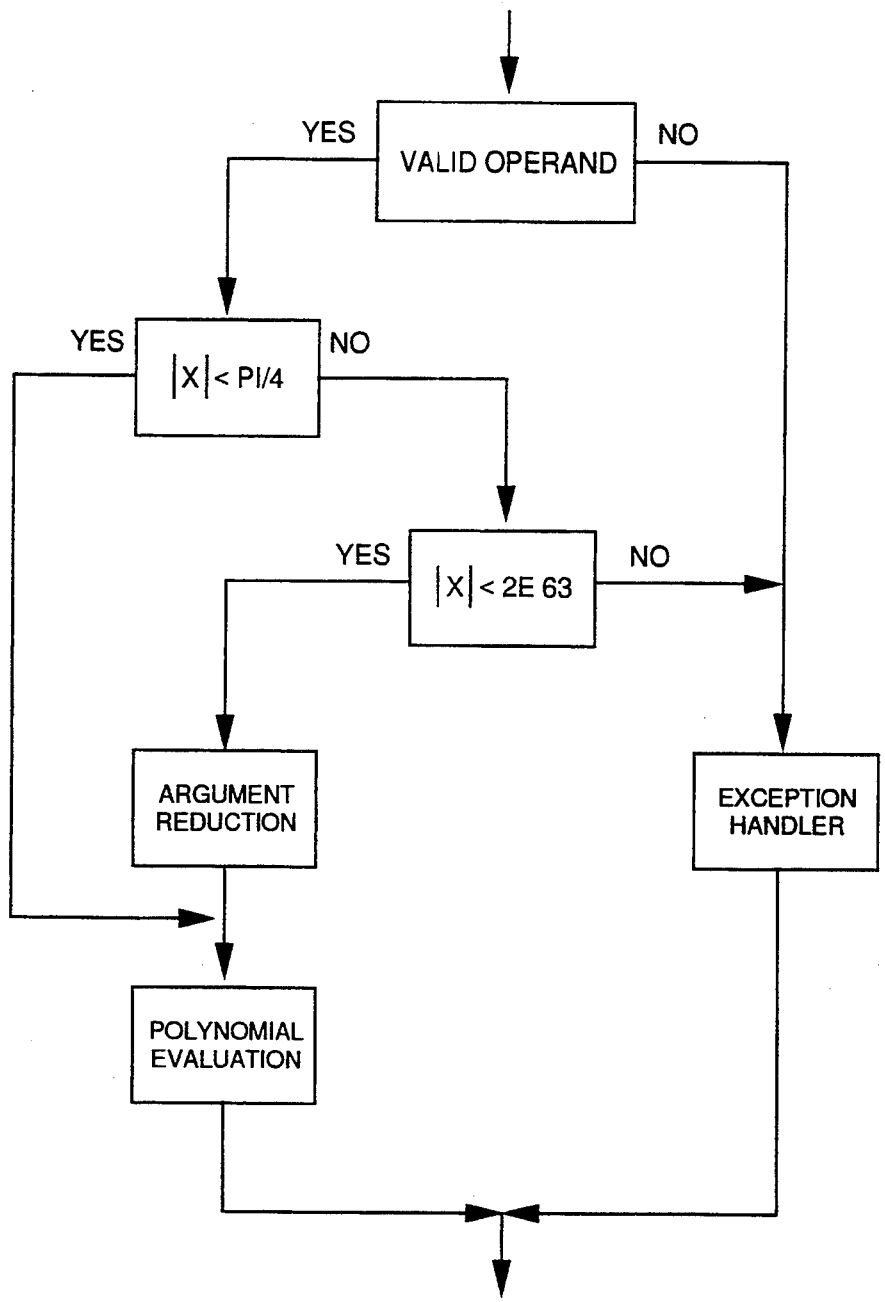

Internal general algorithm according to the invention for the calculation of trigonometric functions is provided with respect to FIG. 1.

A control is made on the validity of the operand for which trigonometric functions are calculated: if operand is invalid, there is no calculation and a branch is made to an exception handling routine.

A control is made on the value for valid operand arguments: if absolute value of the argument is lower than PI/4, polynomial evaluation of the trigonometric function is directly performed, if absolute value of the argument is higher than 2E63 then a branch is made to already mentioned exception handling routine, and if absolute value of the argument is comprised between PI/4 and 2E63, the argument is reduced to a value comprised between 0 and PI/4 according to the system of the present invention, before actual polynomial evaluation of the trigonometric function.

Polynomial approximations (such as Tchebitchev/Pade polynomials or others) are calculated according to the polynomial choices, in the range 0 to PI/4. It is then easy to the man skilled in the art, using well known trigonometric transformations to go from this domain to the complete unit circle.

Argument reduction is logically equivalent to a partial remainder operation with respect to PI/4. Partial remainder function is defined as the following operation:

(1) PREM=X−((PI/4)*N)=X−((PI/4)*Integer(X/(PI/4)))

with:
PREM=Partial REMainder or reduced argument within the range $|X| < PI/4$
X=Argument to reduce (PI/4=$<|X|<$2E63)

N=Integer obtained by chopping the exact quotient X/(PI/4) towards zero.

Just like a divide operation, partial remainder is obtained by performing successive scaled subtractions until the intermediate remainder becomes less than the divisor, to finally represent the partial remainder. Although both functions operate similarly, accuracy of their respective results differs.

If there is no hardware number of bits (bus) limitation, accuracy of the quotient is, at most, equal to the accuracy of the less accurate operand. But partial remainder result is generally calculated on the same bus width as the arithmetic hardware, therefore its accuracy is decreased by the number of bits necessary to represent the integer part of the quotient, as defined by the following relation (2) Partial remainder accuracy =Arithmetic hardware width−Integer $|Log2(N)|$ with N as previously defined.

Moreover, this result may be altered by leading zeros which yet reduce even more the accuracy.

As X varies within the range PI/4 to 2E63, up to 63 bits may be necessary to represent N which is equal to the integer part of the quotient X/(PI/4). On the other hand, reaching, after polynomial evaluation, a relative error of less than 2E-63 requires providing a 67 significant bit reduced argument (partial remainder). By rearranging equation (2) the bus width on which partial remainder has to be calculated is:

(3) Arithmetic hardware width=Partial remainder accuracy+Integer $|LOG2(N)|$

Arithmetic hardware bus width=67+63=130

PI value is never totally accurate. Rounding of PI to fit arithmetic hardware bus width, creates more the effect of a rounded period than a rounded argument. Anyway, to have a chance of having the desired accuracy (2E-63), PI/4 has to be stored internally with at least 130 significant bits. As will be seen further, in the processor of the present invention, PI/4 is stored in a ROM as two 67-bit mantissa words corresponding to 134 significant bits. This allows to handle up to 4 leading zeros (63+67+4=134) when argument is close to a multiple of PI/4.

Argument X can be expressed as an original angle, A, less than 2PI, plus a certain amount M, of 2PI revolutions.

(4) X=(M*(2PI))+A

So X/(PI/4) can be expressed as:

(5) X/(PI/4)=((M*(2PI))+A)*4/PI

X/(PI/4)=8 * M+A*4/PI

If we call K the integer part of A*4/PI, then K is comprised between 0 and 7 because A is less than 2PI. So (5) becomes:

(6) X/(PI/4)=(8*M+K)+FRACT(A*4/PI)

with FRACT being the fractional part of A*4/PI.

K therefore indicates in which of the eigth PI/4 segments of the unit Circle A is:

K=0 means A=PREM as defined in (1) and the functions are calculated directly, i.e SIN(X)=SIN(-PREM).

K=1 means A=PI/4+PREM and SIN(X)=COS(-PI/2−X). Then, SIN(A)=COS(PI/2−PI/4−-PREM)=COS(PI/4−PREM).

K=2 means A=PI/2+PREM and SIN(X)=COS(-PI/2−X). Then, SIN(A)=COS(PI/2−PI/2−-PREM)=COS(−PREM)=COS(PREM).

K=3 means A=3*PI/4+PREM and SIN(X)=SIN(PI−X). Then, SIN(A)=SIN(PI−3*PI/4−PREM)=SIN(PI/4−PREM).

So depending upon K the following adjustments have to be done ('PN' being the polynomial to calculate for an argument 'F' as defined):

SINE CORRECTION:

| X | Sign(X) | K | Sig(SINX) | Polynom | F |
|---|---|---|---|---|---|
| −2PI → −7PI/4 | 1 | 7 | 0 | PNsin | PI/4 − PREM |
| −7PI/4 → −3PI/2 | 1 | 6 | 0 | PNcos | PREM |
| −3PI/2 → −5PI/4 | 1 | 5 | 0 | PNcos | PI/4 − PREM |
| −5PI/4 → −PI | 1 | 4 | 0 | PNsin | PREM |
| −PI → −3PI/4 | 1 | 3 | 1 | PNsin | PI/4 − PREM |
| −3PI/4 → −PI/2 | 1 | 2 | 1 | PNcos | PREM |
| −PI/2 → −PI/4 | 1 | 1 | 1 | PNcos | PI/4 − PREM |
| −PI/4 → 0 | 1 | 0 | 1 | PNsin | PREM |
| 0 → PI/4 | 0 | 0 | 0 | PNsin | PREM |
| PI/4 → PI/2 | 0 | 1 | 0 | PNcos | PI/4 − PREM |
| PI/2 → 3PI/4 | 0 | 2 | 0 | PNcos | PREM |
| 3PI/4 → PI | 0 | 3 | 0 | PNsin | PI/4 − PREM |
| PI → 5PI/4 | 0 | 4 | 1 | PNsin | PREM |
| 5PI/4 → 3PI/2 | 0 | 5 | 1 | PNcos | PI/4 − PREM |
| 3PI/2 → 7PI/4 | 0 | 6 | 1 | PNcos | PREM |
| 7PI/4 → 2PI | 0 | 7 | 1 | PNsin | PI/4 − PREM |

COSINE CORRECTION

| X | Sign(X) | K | Sig(COSX) | Polynom | F |
|---|---|---|---|---|---|
| −2PI → −7PI/4 | 1 | 7 | 0 | PNcos | PI/4 − PREM |
| −7PI/4 → −3PI/2 | 1 | 6 | 0 | PNsin | PREM |
| −3PI/2 → 5PI/4 | 1 | 5 | 1 | PNsin | PI/4 − PREM |
| −5PI/4 → −PI | 1 | 4 | 1 | PNcos | PREM |
| −PI → −3PI/4 | 1 | 3 | 1 | PNcos | PI/4 − PREM |
| −3PI/4 → −PI/2 | 1 | 2 | 1 | PNsin | PREM |
| −PI/2 → −PI/4 | 1 | 1 | 0 | PNsin | PI/4 − PREM |
| −PI/4 → 0 | 1 | 0 | 0 | PNcos | PREM |
| 0 → PI/4 | 0 | 0 | 0 | PNcos | PREM |
| PI/4 → PI/2 | 0 | 1 | 0 | PNsin | PI/4 − PREM |
| PI/2 → 3PI/4 | 0 | 2 | 1 | PNsin | PREM |
| 3PI/4 → PI | 0 | 3 | 1 | PNcos | PI/4 − PREM |
| PI → 5PI/4 | 0 | 4 | 1 | PNcos | PREM |
| 5PI/4 → 3PI/2 | 0 | 5 | 1 | PNsin | PI/4 − PREM |
| 3PI/2 → 7PI/4 | 0 | 6 | 0 | PNsin | PREM |
| 7PI/4 → 2PI | 0 | 7 | 0 | PNcos | PI/4 − PREM |

TANGENT CORRECTION

| X | Sign(X) | K | Sig(TGX) | Polynom | F |
|---|---|---|---|---|---|
| −PI → −3PI/4 | 1 | 3 | 0 | PNtg | PI/4 − PREM |
| −3PI/4 → −PI/2 | 1 | 2 | 0 | PN1/tg | PREM |
| −PI/2 → −PI/4 | 1 | 1 | 1 | PN1/tg | PI/4 − PREM |
| −PI/4 → 0 | 1 | 0 | 1 | PNtg | PREM |
| 0 → PI/4 | 0 | 0 | 0 | PNtg | PREM |
| PI/4 → PI/2 | 0 | 1 | 0 | PN1/tg | PI/4 − PREM |
| PI/2 → 3PI/4 | 0 | 2 | 1 | PN1/tg | PREM |
| 3PI/4 → PI | 0 | 3 | 1 | PNtg | PI/4 − PREM |

As already mentioned, to provide a polynomial approximation with a relative error less than 2E-63 for X within the range PI/4−2E63, partial remainder of X/(PI/4) has to be calculated with PI/4 represented with 134 significant bits.

By increasing appropriately the width of the arithmetic hardware bus, the right accuracy could be provided. Just by tuning correctly the logic to control dataflow, certain arithmetic operations could be computed on a 134 bit hardware, and all others on the bus width required by extended IEEE format (67 mantissa bit internally and 64 externally). This solution however would only solve the accuracy problem of reduced argument without taking in account:

Execution time: Computing an arithmetic operation on a 134 bit hardware would require cycles due to a high number of logic levels to go through. That means numerous extra cycles would be required to perform the appropriate partial remainder operation, setting an execution time being up to 3 times the time needed to approximate Sine/Cosine with X<PI/4, which is unacceptable.

Silicon area: to expand arithmetic hardware bus width from 67 to 134 bits just for partial remainder purpose, would require several hundred extra cells equivalent to a mere 5 to 7% of the whole processor cell count. Paying such cost for an instruction not intensively used, would not comply with one of the three previously-mentioned requirements i.e. i.e. ze silicon area exclusive to argument reduction.

Description of a preferred embodiment of the invention is provided hereafter.

Figure 3:
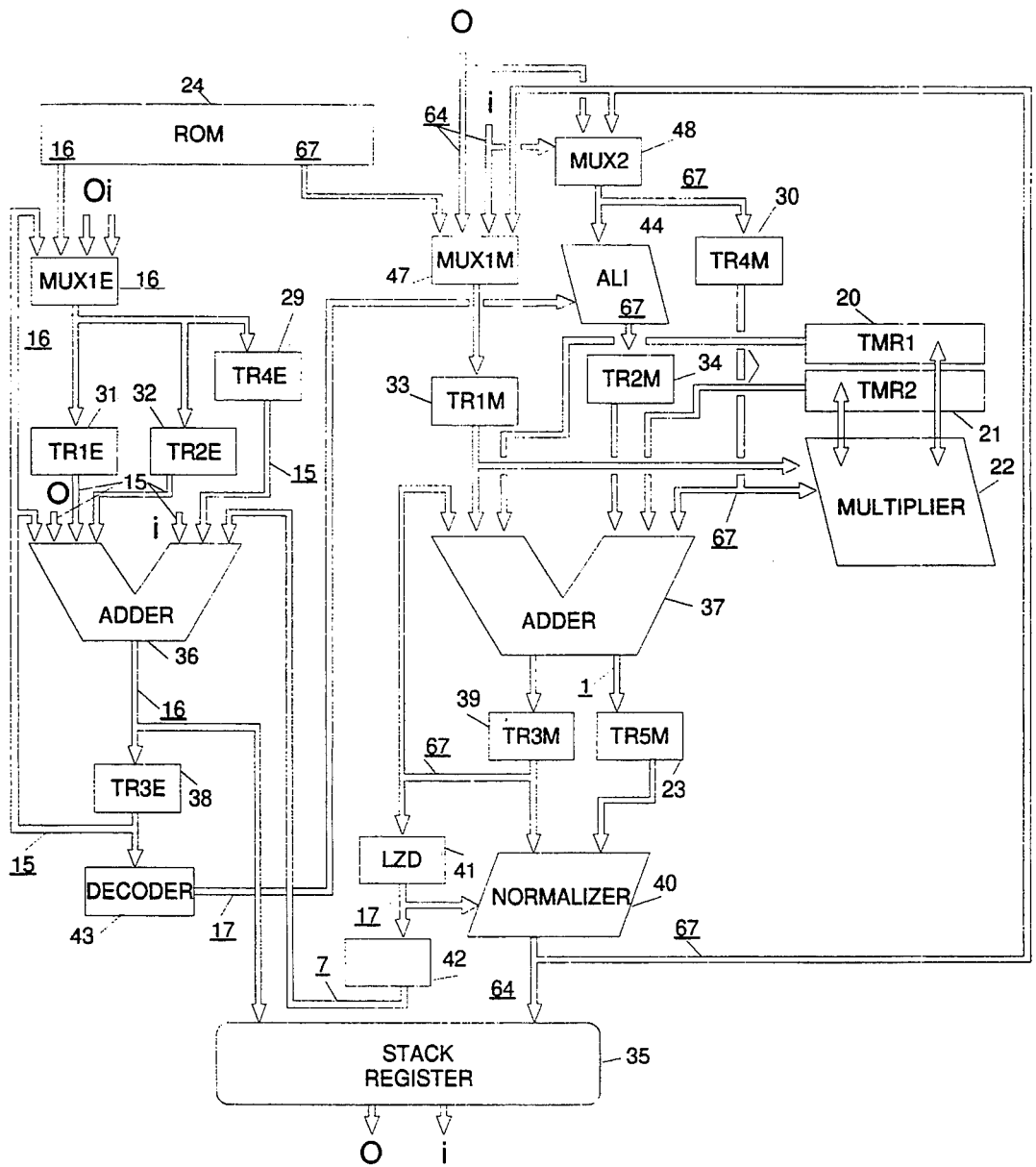

The solution is provided with respect to a known processor now described FIG. 3.

According to this figure, content of 80-bit register 20 will be designated hereafter as TMR1, 80-bit register 21 as TMR2, 15-bit register 29 as TR4E, 67-bit register 30 as TR4M, 15-bit register 31 as TR1E, 15-bit register 32 as TR2E, 67-bit register 33 as TR1M, 67-bit register 34 as TR2M, 68-bit register 39 as TR3M, 16-bit register 38 as TR3E, 67-bit register 23 as TR5M.

92×83-bit ROM 24 contains arithmetic constant values.

The main characteristics of the processor are :

Exponent arithmetic hardware handles 15 bit numbers. A End Around Carry adder allows a one cycle exponent subtraction. The shift amounts to aligner 44 latched into register 38 control the shifter (ALI) thru decode stage 43.

Mantissa arithmetic hardware handles 67 bit numbers. The 64 mantissa bits plus three "extra" bits called Guard, Round and Sticky bit. These bits are used in the rounding operation according to the IEEE standard to maintain accuracy when the precision of a result exceeds that available for finite hardware. A 67 bit mantissa subtraction uses End Around Carry scheme and requires one cycle and half. The multiplication is performed as 5 partial multiplies thru 67×14-bit multiplier 22 followed by a final add. The adder length is, in fact, 80 bits to be able to execute this last addition in one cycle. The multiply array includes Booth encoder and Wallace tree. Both aligner 44 and normalizer 40 perform until 63 bit shift in one cycle. Register 42 latches encoded leading zero number used within the following cycle by exponent hardware when normalization occurs.

Seven temporary registers (TR1−>TR5, TMR1 and TMR2) are used as temporary registers to perform the mathematical operations. Exponent part of these registers is called TRxE and the Mantissa part TRxM.

Exponents and mantissas for two operands are separately stored in different input registers. Originally, exponents of the two operands are stored in input registers 31 and 32. Likewise, mantissas are stored in input registers 33 and 34. The operands are sequentially or preferably simultaneously extracted from two zones of a 8×80-bit stack register referenced 35, e.g. respectively at addresses 0 and i (i=1 to 7). Stack register 35 is of the two-port READ and one-port WRITE type. 0 and I busses are dual 80-bit data busses that convey exponent and mantissa of two data out of stack 35.

Addition/subtraction operation between operands is achieved in 16-bit and 80-bit adders 36 and 37 respectively for the exponents and the mantissas. Basically, adders are loaded by data contained in their respective input registers. Data computed by the adders, i.e. partial results of the ADD/SUB operation, are stored in two distinct output registers. The data is loaded in output register 38 from adder 36 for exponent data, and in output register 39 from adder 37 for the mantissa data (68 bits). Output of adder 36 is connected to exponent input of stack 35. Output of register 39 is connected to both a normalizer circuit 40 and a leading zero encoder circuit (LZD) 41. Whenever necessary, mantissa stored in register 39 is arranged at the IEEE format in normalizer 40. The number of leading zeroes of the mantissa stored in register 39 is first calculated, then encoded in encoder circuit 41, finally, stored in register 42. Said encoded number also controls normalizer 40. Output of normalizer 40 is applied to the mantissa input of stack 35. The output of register 38 is connected to decoder circuit 43, so that its content value is decoded therein. The output of decoder circuit 43 is applied to aligner 44. Aligner 44 drives input register 34. The carry out bit c generated in mantissa adder 37 is connected to the 68th position of register 39. Because as mentioned above, a rounding operation of the mantissa result may be necessary, the output of register 38 is applied to the left input of exponent adder 36, and one input of the four-way multiplexer circuit 16, whose other inputs are fed by stack 35 and ROM 24. Similarly, the output of register 42 is applied to the right input of adder 36. As a matter of fact, each bit generated by register 42 is applied to one input of a XOR circuit (not represented) included in adder 36 as standard whose other input receives a control bit generated by the control logic which depends on the operation ADD or SUB to be completed. If the control bit is equal to 0, the bit is not complemented, otherwise the bit is complemented.

As far as the mantissa adder is concerned, the 0 and i busses and the outputs of normalizer 40, are applied to four-way multiplexer 47 and three-way multiplexer 48 which respectively feed registers 33 and 34 either directly (for register 33) or via aligner 44 (for register 34).

The exponent and mantissa of the result, after normalization and rounding, are stored in stack 35. Stack 35 operates as a RAM where all binary operands and signs are stored. The sign is generated in the control logic and simultaneously stored in stack 35. The circuits for the sign processing are not shown.

More detailed explanation regarding the processor can be found in European Patent application 92480165.7 (FR991030) filed on Nov. 5th, 1992, and assigned to the same assignee as the present application, the teaching of which is incorporated in full in the present description.

In the known processor of FIG. 3, a multiply operation executes several times faster than a divide one. Taking into account such features, the specific partial remainder operation may be reformulated without divide operation as following:

$PREM = X - ((PI/4) * Integer(X/(PI/4)))$
$X = (PI/4) * (FRACT(X*(4/PI)) + Integer(X*(4/PI))$
$PREM = PI/4 * FRACT(X*(4/PI))$
$PI/4 - PREM = PI/4 - PI/4 * FRACT(X*(4/PI))$
$PI/4 - PREM = PI/4 * (1 - FRACT(X*(4/PI)))$ with
FRACT being the fractional part.

The problem of multiplying 4/PI represented on 134 bits by X which has only 67 significant bits is handled by the hardware handling on 134 bits the result of the multiplication of two 67 significant bit mantissas, operation (4/PI)*X being obtained by just performing successive ordinary 67 bit calculations, as seen FIG. 5.

This operation is performed in 16 cycles which is still reasonable compared to execution time of polynomial approximation (around 90 cycles).

Figure 4:
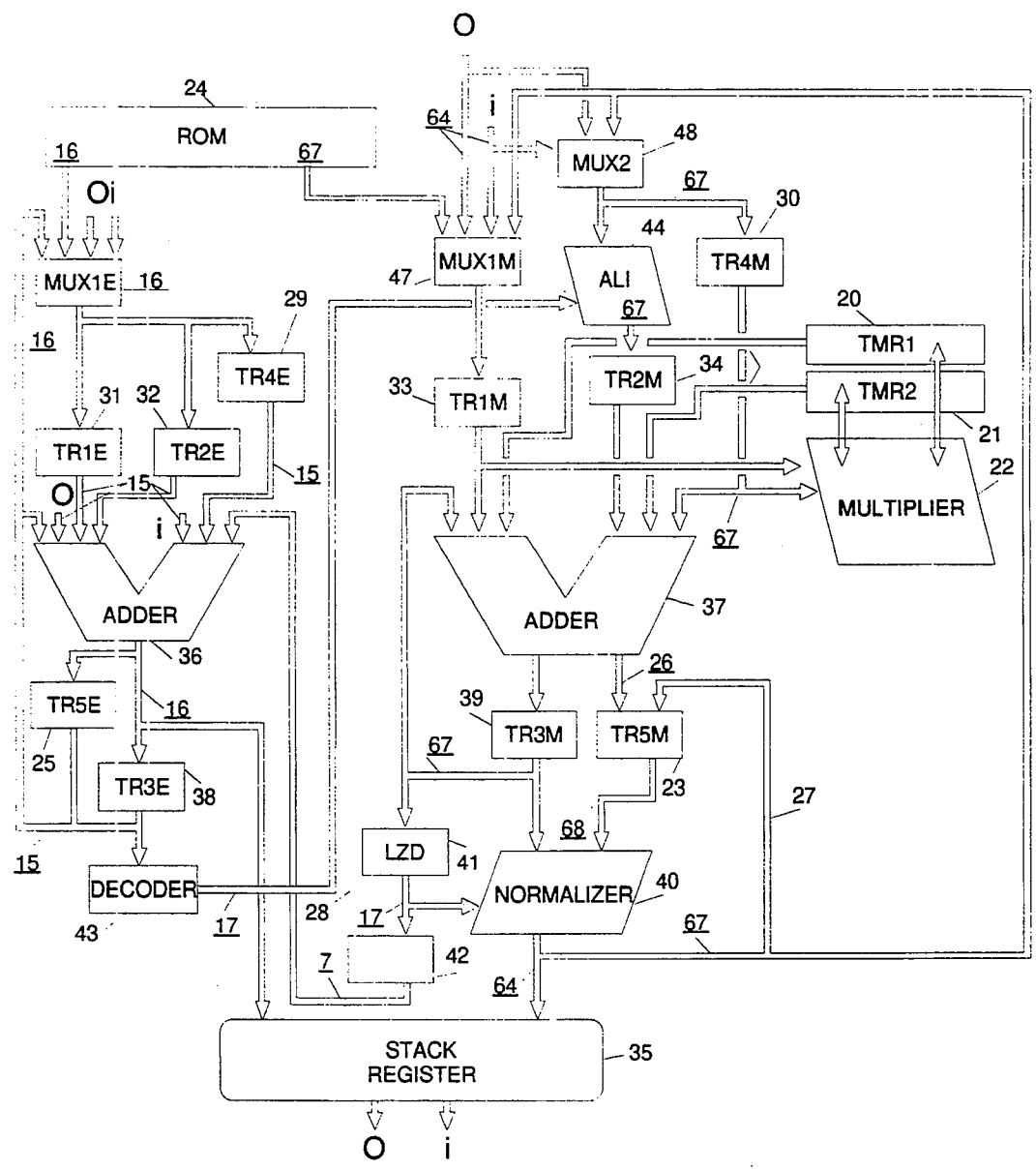

With the solution of the present invention, added hardware in the dataflow of the processor is really minimized as described with respect to FIG. 4:

A bus (26) now connects the 14 LSB adder 37 outputs to a new entry of quotient Register 23 used for divide.

The carry of the first 67 bit step of the final 134 bit add is reintroduced to handle the second 67 bit step.

A new register 25 (content: TR5E) has been implemented. Partial results are stored in the temporary registers used intensively by the main instructions (Add, Sub, Multiply and Divide).

Figure 6:
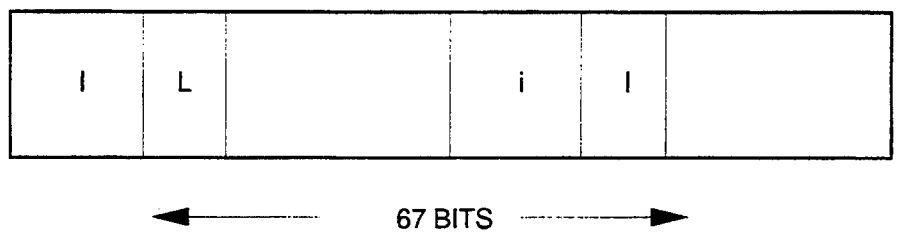
FIG. 6 illustrates extracting fractional part of a 134 bit final result.

Now, in 17 more cycles, fractional part of the 134 bit final result has still to be extracted (see FIG. 6) which is also done by performing Successive 67 bit operation without new hardware except that normalizer 40 is increased to the left by three bits to not lose the 3 LSB of I when the shift by i is performed to extract the fractional part. Three latches are also added to store these bits which represents K in the above tables. The added logic is about 65 cells.

To extract the 67 fractional part of the result, the high part has to be shifted by i, the low part has to be shifted by 67−i and the two shifted numbers are concatenated by an ADD operation. But the fractional part can have leading zero.

To not lose precision the extracted fractional number must have 67 significant bits. That means the leading zero L must be dropped by a shift left of 1 and the low part must be shifted right by 67−1 and these two shifted numbers are concatenated by an ADD operation.

By optimization only one ADD Operation is needed to extract 67 significant bits as followed:

Force normalizer 40 to shift left by i bits the high word of (4/PI)*X. At the same time, the 3 LSB of shifted data out which corresponds to the integer part of (4/PI)*X, are stored to define the argument correction to perform later (See Reference 10). i is subtracted from 67 by the exponent adder and this result in stored.

The preceding shifted number is normalized (the 1 leading zero are dropped) and 1 is stored.

The exponent adder subtracts 1 from 67−i. The result 67−i−1 is stored.

Force the aligner 44 to shift right by (67−i−1) bits the low part of (4/PI)*X.

Add the high part shifted left by i+1 and the low part shifted right by 67−i−1 to get a 67 significant bit number.

Moreover to avoid to lost accuracy when argument correction needs to be done (specially when PREM is around PI/4), 1−Fractional part is also performed on 134 bits by successive 67 bit operations First the low part is subtracted from zero, then the high part is subtracted from zero with a carry in=carry out of the previous result. After that the same steps as described above are performed to extract the fractional part.

Figure 7:
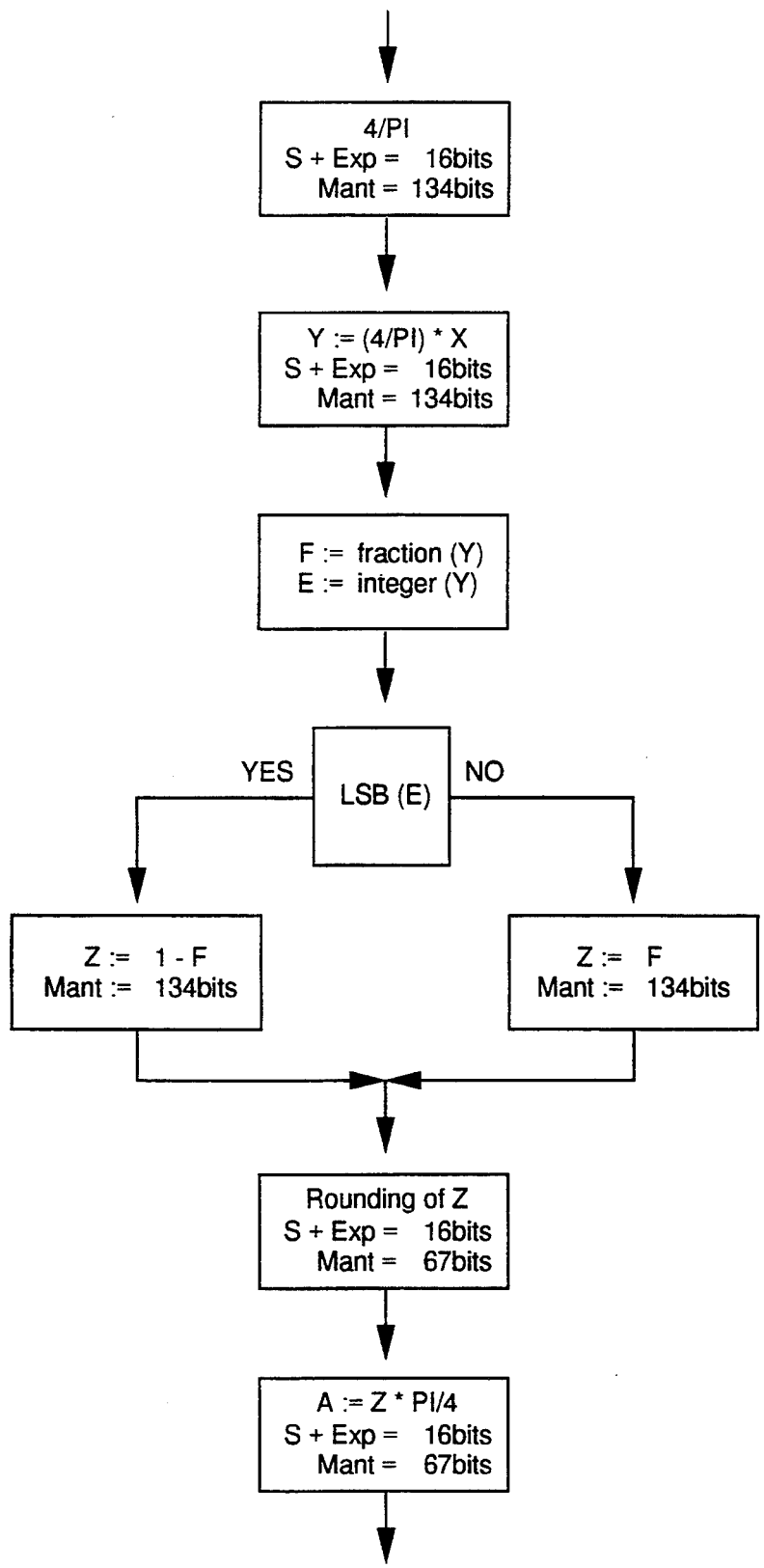
FIG. 7 illustrates the argument reduction/correction sequence.

Only the last operation in the argument reduction/correction steps—multiply the extracted fractional part by PI/4—is performed on 67 bits FIG. 7 illustrates the argument reduction/correction sequence.

The whole argument reduction/correction needs between 30 and 34 cycles depending on the correction to be performed. This represents around ⅓ the execution time of polynomial approximation (around 90 cycles for Sine/Cosine).

Cycles are detailed hereafter:

Multiplication (4/PI)*X on 134 bits

Cycle 1: initialization

Operand X is checked according to the IEEE standard set of rules (data valid, equals to zero, infinity, denormalized number, etc. . . . ).

TR1M is set with the low order bits (67 to 134) of 4/PI, which are stored in R0M 24.

Operand X is loaded into TR4, the mantissa part into TR4M and the exponent part into TR4E.

TMR1 and TMR2 are initialized respectively with X'0 . . 0' and X'80 . . 0'.

TR2E is set to the value 2E63 to check whether X is out of range.

Cycle 2: first multiply cycle

TMR1, TMR2 and the seven first partial terms produced by the booth encoder of multiplier 22 are reduced through the Wallace tree to 2 numbers latched back into TMR1 and TMR2

Exponent adder performs TR2E−TR4E. The exponent carry adder is latched. If its value is zero, this means that X is out of range, i.e bigger than 2E63.

Cycle 3: second multiply cycle

The most significant part of TMR1 and TMR2 are introduced in the Wallace tree with the next partial terms (coming from TR1M and TR4M thru the Booth encoder) to get 2 numbers latched back into TMR1 and TMR2

The 14 least significant bits of TMR1 and TMR2 are added in the mantissa adder and ORed to generate a temporary sticky bit. The eventual carry is introduced in the Wallace tree to be added to the partial terms in the same cycle.

The ROM address is incremented to be ready to read the next word.

Cycle 4: third multiply cycle

Same mantissa processing as previous cycle.

Previous temporary sticky bit is ORed with the 14 least significant bit result to Generate a new temporary sticky bit.

If the exponent adder Carry latched in cycle 2 is 0, i.e. X bigger than 2E63, the process is terminated.

Cycle 5: fourth multiply cycle

Same processing as previous cycle

Cycle 6: fifth multiply cycle

Same processing as previous cycle

Cycle 7: final addition

TMR1 and TMR2 are added (80 bit addition). The result sets TR3M (68 bit wide).

The TR3M LSB is the OR of previous temporary sticky bits with the 13 least significant bits of the final addition.

TR1M is set to the high order bits (0−67) of 4/PI, which are stored in ROM 24.

TMR1 and TMR2 are initialized respectively with X'0 . . 0' and X'80 . . 0'.

TR2E is set to exponent of 4/PI.

Note: At this stage, the product of the low order bit of (4*PI) by X is latched into TR3M.

Cycle 8: first multiply cycle

TMR1, TMR2 and the seven first partial terms produced by the booth encoder, are reduced through the Wallace tree to get 2 numbers latched into TMR1 and TMR2.

Cycle 9: second multiply cycle

The most significant part of TMR1 and TMR2 are introduced in the Wallace tree with the next partial terms (Coming from TR1M and TR4M thru the Booth encoder) to get 2 numbers latched back into TMR1 and TMR2.

The 14 LSB of TMR1 and TMR2 are added in the mantissa adder and stored in the 14 MSB of TR5M. The eventual carry is introduced in the Wallace tree and added to the partial terms in the same cycle.

The Exponent adder performs TR2E+TR4E+1 because the multiply of two mantissas of form 1.XXX . . . . XXX can be 1X.XXX . . . . XXX and the final multiply result is normalized.

The result is latched into TR3E. This number represents the exponent of X multiplied by 4/PI.

Cycle 10: third multiply cycle

Same mantissa processing as previous cycle.

TR5M is shifted right by 14 bits, and the new 14 bit result coming from the adder is stored in the 14 MSB of TR5M.

The Exponent adder performs TR3E−Bias. This bias correction is needed because two biases have been added in cycle 9.

The result is latched into TR3E and TR5E. This number represents the biased exponent of X multiplied by 4/PI.

Cycle 11: fourth multiply cycle

Same mantissa processing as previous cycle.

TR5M is shifted right by 14 bits, and the new 14 bit result coming from the adder is stored in the 14 MSB of TR5M.

Cycle 12: fifth multiply cycle

Same mantissa processing as previous cycle.

Cycle 13: final addition

TR3M, which contains the previous result, i.e. the product of the low order bit of (4*PI) by X is transferred into TR2M through aligner 44 to be added latter with the low part of the multiplication of the high order bit of (4/PI) by X.

TMR1 and TMR2 are added (80 bit addition). The result is loaded in TR3M (68 bit wide).

TR5M is shifted right by 14 bits, and the 14 LSB of the adder output are loaded in the 14 MSB of TR5M.

Note: at this stage, the low order part of the product of the high order bit of (4*PI) by X is in TR5M when the high order part is in TR3M.

Cycle 14:

TR5M is transferred into TR1M through normalizer 40 and MUX1M.

Cycle 15:

TR3M is transferred into TR4M through normalizer 40 and aligner 44 (both with zero shifts).

TR2M and TR1M are added trough the mantissa adder. The result is latched into TR3M. The mantissa carry out is latched. This 67-bit number is the low part of the extended multiply.

The value 2E-1, which is stored in ROM 24, is loaded into TR4E.

Cycle 16:

TR3M is transferred into TR5M.

The previously latched mantissa adder carry out is added trough the mantissa adder with TR4M. The result in latched in TR3M.

Exponent Adder subtracts from TR2E, which contents the, exponent of the product (4/PI)*X, TR4E, which contains 2E-1. The bias exponent of the real number 2E-1 is used to take into account that the mantissa part of a normalized number is always 1.XXX . . . . . XXXXX (this leading one must also be shifted out to get the fractional part) and that the number in TR2E is biased.

The result (i) latched in TR3E, is the number of bits of the integer part of the remainder.

Note: at this point, the low order part of the product (4*PI) by X is in TR5M when the high order part of it is in TR3M. Depending upon the instruction to calculate and the low order bits of the integer part of the product (4/PI)*X ,i.e. K value, PREM is calculated, i.e. GOTO cycle 20, or PI/4−PREM, i.e. next cycle

Calculation of 1—FRACT(X*(4/PI)) on 134 bits

Cycle 17:

Since at least one left bit is lost by the extraction of the fractional part, 1−(X*(4/PI)) can be calculated as described in Cycles 18 and 19, and then the fractional part is extracted in the same cycle as for X*(4/PI).

TR5M is transferred into TR4M through normalizer 40 (shift zero).

Cycle 18:

The low order part of product of (4*PI) by X, latched into TR4M, is subtracted from zero. The result with the carry out is latched into TR3M.

TR3M is transferred into TR2M through normalizer 40 and aligner 44 (shift zero).

Cycle 19:

The high order part of product of (4*PI) by X, latched into TR2M, is subtracted from zero (1.000 . . . 000-1.XXX . . . XXX is equivalent to 0.000 . . . 000-.XXX . . . XXX) with carry in=carry out of cycle 18. The result is latched into TR3M.

TR3M is transferred to TR5M through normalizer 40.

Note: at this point, the high part is again in TR3M and the low part in TR5M.

Extraction of the fractional part of the product (4/PI)*X or 1−((4/PI)*X)

Cycle 20

TR3M is shifted left by i (loaded in cycle 16 into TR3E and decoded by DEC to control the normalizer) through NOR then shifted right by ALI by i and stored into TR2M. The I part of the number has been replaced by i ZEROS.

Cycle 21

The value 67 stored in ROM 24 is loaded into TR1E. TR2M is loaded thru the adder into TR3M.

Cycle 22

TR3M is normalized through NOR and stored into TR1M to suppress the leading zero of the fractional part. The number of leading zero i+1 is stored into register 42.

The high part of FRACT is now at the left side of TR1M and the low part is still in TR5M.

Cycle 23

Register 42 (i+1) is subtracted from TR1E (67) by the exponent adder and stored into TR3E.

Cycle 24

TR5M thru NOR(shift left zero) and MUX2 is shifted right through the aligner by 67-i-1 bits (TR3E controls the aligner through the decode circuit DEC) and loaded into TR2M.

The high part of FRACT is at the left side of TR1M and now the low part is at the the right side of TR2M.

Cycle 25

Register 42 (i+1) is subtracted from TR5E (exponent of X*4/PI loaded in cycle 10) by the exponent adder and stored into TR3E. TR3E holds now the exponent of the fractional part.

TR1M is added with TR2M through the mantissa adder and stored into TR3M. The two parts have been concatenated and the result is a number of 67 significant bits.

Note: at this point, the fractional part of X*4/PI or of 1−X*4/PI is in TR3M.

Final product by PI/4 on 67 bits

Cycle 26

The mantissa part of PI/4, which are store in ROM 24, are loaded into TR1M.

The exponent part of PI/4, which are store in ROM 24, are loaded into TR4E.

The fractional part stored in TR3M, in transferred through the normalizer to TR4M.

TMR1 and TMR2 are initialized respectively with X'0 . . 0' and X'80 . . 0'.

Cycle 27: first multiply cycle (TR1M×TR4M) TMR1, TMR2 and the seven first partial terms produced by the booth encoder of multiplier 22 are reduced through the Wallace tree to 2 numbers latched back into TMR1 and TMR2

Cycle 28: second multiply cycle

The most significant part of TMR1 and TMR2 are introduced in the Wallace tree with the next partial terms (coming from TR1M and TR4M thru the Booth encoder) to get 2 numbers latched back into TMR1 and TMR2

The 14 least significant bits of TMR1 and TMR2 are added in the mantissa adder and ORed to generate a temporary sticky bit. The eventual carry is introduced in the Wallace tree to be added to the partial terms in the same cycle.

Exponent adder performs TR3E (loaded in cycle 25)+TR4E+1.

Cycle 29: third multiply cycle

Same mantissa processing as previous cycle.

Previous temporary sticky bit is ORed with the 14 bit result to generate new temporary sticky bit.

The Exponent adder performs TR3E—Bias. This bias correction is needed because two biases have been added in cycle 28. The result is latched into TR3E . This number represents the biased exponent of X multiplied by 4/PI.

Cycle 30: fourth multiply cycle

Same processing as previous cycle.

Cycle 31: fifth multiply cycle

Same processing as previous cycle.

Cycle 32: final addition

TMR1 and TMR2 are added (80 bit addition). The result is loaded in TR3M (68 bit wide).

The TR3M LSB is the OR of previous temporary sticky bits with the 13 least significant bit of the final addition.

Cycle 33: Normalization

TR3M, which contains the REDUCED ARGUMENT x, is transferred through the normalizer to TR1M, TR4M and TR5M. This is because, depending upon the trigonometric function to calculate, it may be necessary to compute xE2. So putting the reduced argument x in TR1M and TR4M allows getting ready to start the multiplication of x by x.

We claim:

1. A system for optimizing argument reduction to a value comprised between 0 and a multiple of PI, in a processor comprising:

a) a first block operative to perform pipeline ADD-/SUB/COMPARE operations on argument mantissa of two operands, including:

mantissa input register means for storing the respective mantissas of each of the operands;

a first adder for generating a result by operating on the mantissas stored in said mantissa input register means, responsive to said mantissa input register means;

a first output register for storing the mantissa result, responsive to said first adder, including the carry-out bit generated by the first adder as its most significant bit, a second output register, for storing via a bus m less significant bits of the mantissa result as its m most significant bits, responsive to said first adder, and operable to internally shift its content to the right by m-bits;

a normalizer, attached to said first and second output registers, operable to shift to the left the results stored in the first or second output registers, by a number of bits set by a leading zero detector/encoder, coupled to said first output register to calculate and encode the number of leading zeroes of the mantissa stored in said first output register; and an aligner, feeding a particular one of said mantissa input registers, operable to shift to the right the mantissa stored in said particular one of said mantissa input registers, by a number of bits set by a decoder;

b) a second block operative to perform pipeline ADD-/SUB/COMPARE operations on argument exponents of two operands, and including:

exponent input register means for storing the respective exponents of each of the operands, a second adder for generating a result by operating on the exponents stored in said exponent input register means, and a third and fourth output registers for storing the exponent result, responsive to said second adder, said third and fourth output registers being coupled to said decoder, c) a third block operative to perform pipeline MULTIPLY operations on argument mantissa including an m-bit multiplier, whose inputs are coupled to said mantissa input register means and whose outputs are fed back into the inputs of the first adder, and d) a stacker to pipeline arguments and a ROM for providing input constant values to respectively first and second block, said system comprising:

first connecting means for allowing the normalizer to be also responsive to the decoder, and second connecting means operable for allowing content of said first output register to be latched into said second output register.

2. System according to claim 1 characterized in that said multiple of PI is $\frac{1}{4}$.

* * * * *